(Model.)

H. ERICSON.
HACK SAW.

No. 468,742.  Patented Feb. 9, 1892.

Witnesses:
Chas. H. Gaylord,
L. M. Freeman.

Inventor:
Herman Ericson.
By L. B. Coupland & Co.
Attys.

UNITED STATES PATENT OFFICE.

HERMAN ERICSON, OF CHICAGO, ILLINOIS, ASSIGNOR TO JOHN B. HOLMER, OF SAME PLACE.

HACK-SAW.

SPECIFICATION forming part of Letters Patent No. 468,742, dated February 9, 1892.

Application filed May 2, 1890. Serial No. 350,332. (Model.)

*To all whom it may concern:*

Be it known that I, HERMAN ERICSON, a subject of the King of Sweden, residing at Chicago, in the county of Cook and State of Illinois, have invented certain new and useful Improvements in Hack-Saws, of which the following is a full, clear, and exact description, that will enable others to make and use the same, reference being had to the accompanying drawings, forming a part of this specification, in which—

Figure 1:
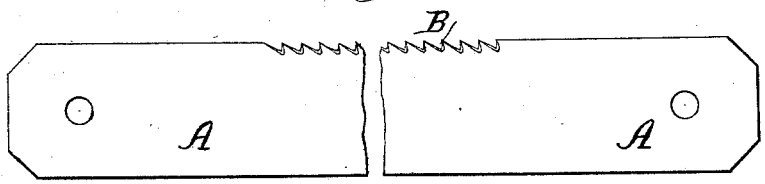
Figure 2:
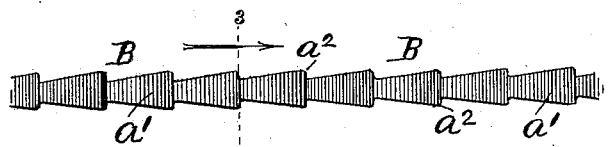
Figure 3:
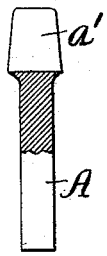
Figure 4:
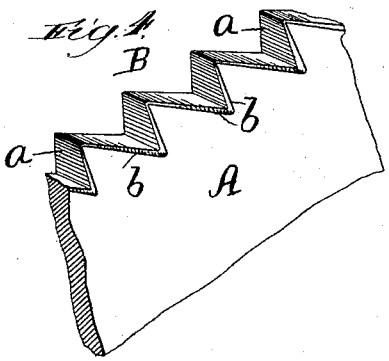

Figure 1 is a side elevation of a saw-blade embodying my improved features; Fig. 2, a plan of the cutting edge or teeth; Fig. 3, a transverse section in plane 3, Fig. 2, looking in the direction indicated by the arrow; and Fig. 4, a perspective of an enlarged or exaggerated broken-away section of a saw-blade.

This invention relates more especially to improvements in that class of saws used in cutting metal bars and the like, and has for its object to provide an article of this character that has a finer and more durable cutting-edge than is ordinarily produced.

Referring to the drawings, A represents the blade of the saw, and B the teeth.

In the process of manufacture the blank forming the saw-blade is first properly tempered. After the process of tempering the saw-blank is placed in a vise or other suitable holding device and the teeth cut by hand. The work of cutting the teeth is done by holding a suitable tool in one hand and striking the same a blow with a hammer held in the other hand. The tool used in the process of cutting the teeth is of the form or shape of the ordinary cold-chisel and highly tempered, the cutting end being of a blunt wedge shape and beveled, so that when held at a certain angle the face or wall $a$ of the teeth will be in a vertical plane with reference to the inclined back or surface $a'$. The teeth cut or formed in this manner flare out equally on both sides of the saw, as shown in Fig. 2, leaving them a little rounded, as at $a^2$. This process of cutting throws out or forms a sharp burr or file edge $b$ along the cutting-edges of the teeth on the respective sides. This continuous burr or file edge forms what may be termed the "set" of the saw, and, being quite sharp, cuts very fast and clears nicely for a free movement. The teeth, by reason of this file edge, will not cramp nor stick in the cut and break out, as the teeth of the ordinary hack-saws do. The durability is therefore much greater and the saw will also cut much faster. By tempering the blade before cutting the teeth the metal is rendered more homogeneous and the life of the saw more than doubled over that of the ordinary kind. The teeth may also be cut much closer together after tempering the blade than before. This is another advantage, as the closer and finer the teeth the less liable they are to break out, for the reason that a greater number of the teeth have a bearing and are cutting at the same time. Take, for instance, one of my improved saws (forming the subject-matter of this application) eight inches in length, which will have about thirty teeth to the inch, whereas the ordinary saw of the same length will have about half that number. In small saws having very fine teeth the burr or file edge may be readily felt by passing the fingers over the sides of the saw or plainly seen by looking through a glass.

Considerable experience and skill are required in cutting the teeth by hand, and the saw is ready for use when the process of forming the teeth is completed.

Having thus described my invention, what I claim as new, and desire to secure by Letters Patent, is—

1. As an improved article of manufacture, a hack-saw having teeth that are narrower at the point than at the base and provided with a burr or file cutting edge on both sides, substantially as described.

2. As an improved article, a hack-saw the teeth whereof are formed with a continuous burr or file cutting edge along their respective sides, substantially as described.

HERMAN ERICSON.

Witnesses:
L. M. FREEMAN,
J. B. DONALSON.